United States Patent
Belgard

[11] Patent Number: 6,087,932
[45] Date of Patent: Jul. 11, 2000

[54] LIGHT CONTROL SYSTEM

[76] Inventor: Jimmie W. Belgard, 7153 Hickory Grove Rd., Deville, La. 71328

[21] Appl. No.: 08/655,710

[22] Filed: Jun. 3, 1996

[51] Int. Cl.$^7$ ..................................................... B60Q 1/26
[52] U.S. Cl. ........................ 340/468; 340/463; 340/464; 340/472; 340/471; 307/10.8
[58] Field of Search ..................... 340/901, 904, 340/905, 982, 463, 464, 468, 471, 472, 332; 116/202; 40/442, 443; 307/10.8

[56] References Cited

U.S. PATENT DOCUMENTS

| | | | |
|---|---|---|---|
| 4,058,794 | 11/1977 | Menke | 340/92 |
| 4,155,069 | 5/1979 | Mason | 340/471 |
| 4,831,357 | 5/1989 | Miller | 340/472 |
| 4,928,084 | 5/1990 | Reiser | 340/479 |
| 5,097,397 | 3/1992 | Stanuch et al. | 362/74 |
| 5,132,666 | 7/1992 | Fahs | 340/468 |
| 5,140,304 | 8/1992 | Miller | 340/472 |
| 5,157,382 | 10/1992 | Stopa | 340/475 |
| 5,296,840 | 3/1994 | Gieffers | 340/474 |
| 5,422,623 | 6/1995 | Bader et al. | 340/331 |
| 5,434,553 | 7/1995 | Rhodes | 340/468 |
| 5,467,071 | 11/1995 | Koenig | 340/433 |
| 5,499,009 | 3/1996 | Davis | 340/468 |
| 5,563,577 | 10/1996 | Adkins | 340/468 |
| 5,644,290 | 7/1997 | Rhodes | 340/468 |

*Primary Examiner*—Jeffery A. Hofsass
*Assistant Examiner*—Daryl C. Pope
*Attorney, Agent, or Firm*—Roy, Kiesel & Tucker

[57] ABSTRACT

The present invention provides a light control system for controlling the operating lights of an emergency vehicle. The light control system (or LCS) will comprise a digital logic controller with a plurality of input pins which are adapted for connection with the operating light switches of the vehicle. The digital logic controller also has a plurality of output pins adapted for connection with the operating lights of the vehicle and a plurality of mode selection switches for selecting a plurality of different modes for controlling the operating lights. In a preferred embodiment, the digital logic controller is a microprocessor.

16 Claims, 2 Drawing Sheets

LIGHT CONTROL SYSTEM

BACKGROUND OF THE INVENTION

1. Technical Field

The present invention relates to warning lights typically for use in emergency vehicles. More particularly, the present invention relates to an apparatus for controlling the operating lights on a vehicle (such as headlights, parking lights, front and rear blinkers, tail lights and reverse lights) so that the operating lights may used for special purposes associated with emergency vehicles, particularly police vehicles.

2. Background of Invention

It is common for emergency vehicles, particularly police cars, not only to signal an emergency situation with rotary lights on the roof of the vehicle (light bars), but also to have the operating lights of the vehicle flash in a conspicuous manner. This flashing of the operating lights may be particularly important when dealing with partially marked police cars (cars without light bars but having decaling and flashing lights on the dash boards) and unmarked police cars.

Present devices for controlling the operating lights of a vehicle generally use mechanical relays or other conventional "hard-wired" circuitry. An example of this can be seen in U.S. Pat. No. 5,434,553 to Rhodes. There exist many inherent disadvantages when creating a given light flashing pattern or lighting function by use of hard-wired circuitry. First, there is the unalterable nature of the lighting function created by the circuitry. If it is found that the lighting function is not desirable or that it has specific disadvantages or limitations, the problem or disadvantage can only practically be corrected by replacing the entirety of the light control circuitry. Related to this disadvantage, the unalterable nature of hard-wired circuitry makes customization of the lighting system to a particular user impractical if not impossible. This may be very important when particular police departments desire, or internal policies require or forbid the use of certain light control characteristics.

Furthermore, hard-wired circuitry limits the complexity or number of lighting functions that may be perform because as the lighting functions become more complex or numerous, the sheer size of the circuitry becomes more impractical. This is particularly true where it is desired to place the main body of the circuitry in the interior of the vehicle (e.g. under the driver's seat) in order to take advantage of the more controlled environmental conditions such as temperature and humidity. Locating the light control device under the driver's seat also offers the advantage of a more protected location and will generally require less wiring to inter-connect the light switches and operating lights with the light control system. Therefore the size limitation when using hard-wired circuitry renders it less feasible when producing certain particularly desirable, but complex lighting functions. For example, the flashing of individual operating lights at frequencies different from the other operating lights rapidly increases the size of the system when using hard-wired circuitry. This is because a separate timing apparatus must be provided for each set of lamps to be flashed at a separate frequency as opposed to using a single timing element to control all frequencies. Additionally, when controlling lights in a special operating mode, it is often desirable to momentarily return several operating lights (but not all) back to their normal operating mode. For example, when the brakes are applied while the vehicle is in hyper-flash mode, the lights in the rear will operate in the normal mode while the lights in the front continue in hyper-flash mode. The amount hard-wired circuitry required to perform this function may render it impractical due to space limitations.

Still another disadvantage of hard-wired circuitry is the inherent limitation on how high of a frequency at which the operating light may be flashed before the intensity of the light is decreased. This phenomena is caused by the requirement that generally the lamp must receive power for a sufficient period of time in order for the filament to reach its full intensity. When the lamp is flashing, hard-wired circuitry will typically supply and discontinue power to the lamp (i.e. turn the lamp "on" and "off") at equal intervals. While the light is flashing at a 1 or 2 Hz frequency, power is being supplied to the bulb during the "on" cycle for a sufficient period for the filament to become fully energized. However, as the frequency reaches 4 and 5 Hz, the "on" interval is not sufficient to fully energize the filament and the lamp cannot reach its full intensity. Therefore a system that could flash the lights at a higher frequency and still maintain full light intensity would be a significant improvement in the art. Such a system would allow more conspicuous light flashing patterns and a larger selection of different flashing patterns.

SUMMARY OF INVENTION

Therefore the present invention provides a light control system for controlling the operating lights of an emergency vehicle. The light control system (or LCS) will comprise a digital logic controller with a plurality of input pins which are adapted for connection with the operating light switches of the vehicle. The digital logic controller also has a plurality of output pins adapted for connection with the operating lights of the vehicle and a plurality of mode selection switches for selecting a plurality of different modes for controlling the operating lights. In a preferred embodiment, the digital logic controller is a microprocessor.

Because the LCS's microprocessor operates on a software program, a large array of different lighting functions is possible. The LCS will allow the vehicle driver to select numerous different modes for flashing or otherwise selectively controlling the operating lights. For example, one mode could be a "hyper-flash" mode wherein the different operating lights are flashed at different frequencies and in different combinations in order to make the emergency vehicle as conspicuous as possible. Another mode could be a "black-out" mode wherein all lamps are purposefully darkened. This will allow a police vehicle to be operated with the most stealth possible since, for example, applying the brakes or putting the vehicle in reverse will not cause a vehicle light to be illuminated. A third advantageous mode would be a "one out" mode. In this mode, the vehicle driver may select one of his headlights to be temporarily turned off. This is a method of disguising a police car at night since it is generally assumed that police cars are well maintained and will not have inoperable headlights.

Additionally, the software based operation of the LCS will allow it to integrate safety features into the various modes listed above by giving certain lighting functions priority over others. For example, if the LCS is in a hyper-flash mode, two or more of the lights in the rear of the vehicle will flash at different frequencies and sequences. If the vehicle driver then applies the brakes, all the flashing lights in the rear of the vehicle will cease while the brakes are applied. This allows the brake lights to convey a clear unambiguous signal to following cars without the flashing lights detracting from the signal conveyed by the brake lights.

Furthermore, because the LCS lighting functions are base on a software program run in the microprocessor, an entirely new set of functions can be implemented simply by loading new software in the microprocessor. This gives the LCS the very distinct advantage of being "customized" for the particular police department using the LCS. In the common instance where several police departments have overlapping jurisdictions (e.g. city police, county sheriffs, and state highway patrolmen), a different light flashing combination could be used for each police department. In emergency situations, this would allow instant identification of the particular department when the vehicle markings cannot be readily made out because of distance or lighting conditions.

This also allows lighting functions of the LCS to be quickly and inexpensively modified after the LCS has been installed on the vehicle. For example, some police departments may find certain features of the LCS, such as the black-out mode, are not appropriate for the level of training of their officers. The LCS can easily be reprogrammed to eliminate this mode. By the same token, a police department which desires a black-out mode may later want to add certain safety features to the black-out mode. These safety features could include the LCS exiting black-out mode when the vehicle is put in reverse or when the ignition switch is turned off. The programmable nature of the LCS makes these alterations readily possible.

The LCS will also be capable of flashing the operating lights at a higher frequency without a corresponding loss in light intensity. The microprocessor allows the LCS to utilize pulse width modulation to insure the lamp filament is supplied with power for a sufficient time for the filament to reach its full brightness or intensity. Pulse width modulation is in effect regulating the ratio of time power is supplied to the filament versus the time power is being discontinued during each flash cycle. By having the micro processor leave the lamp "on" for a longer period than the lamp is "off" in each flash cycle, the filament has sufficient time to reach its maximum intensity. Thus full light intensity can still be achieved even at frequencies such as 4 and even 5 Hz.

While the filament of most lamps will reach the maximum intensity by leaving the lamp "on" longer than "off", it is envisioned that there may be certain lamps whose filaments reach maximum brightness much more quickly than other lamps. In such cases it will not be necessary to leave the lamp "on" longer than "off". The maximum distinction between flashes may actually be obtained by having the lamp turned off longer than it is turned on. When such lamps are encountered, the LCS program can easily be modified to accommodate this situation.

DETAILED DESCRIPTION

Figure 1:
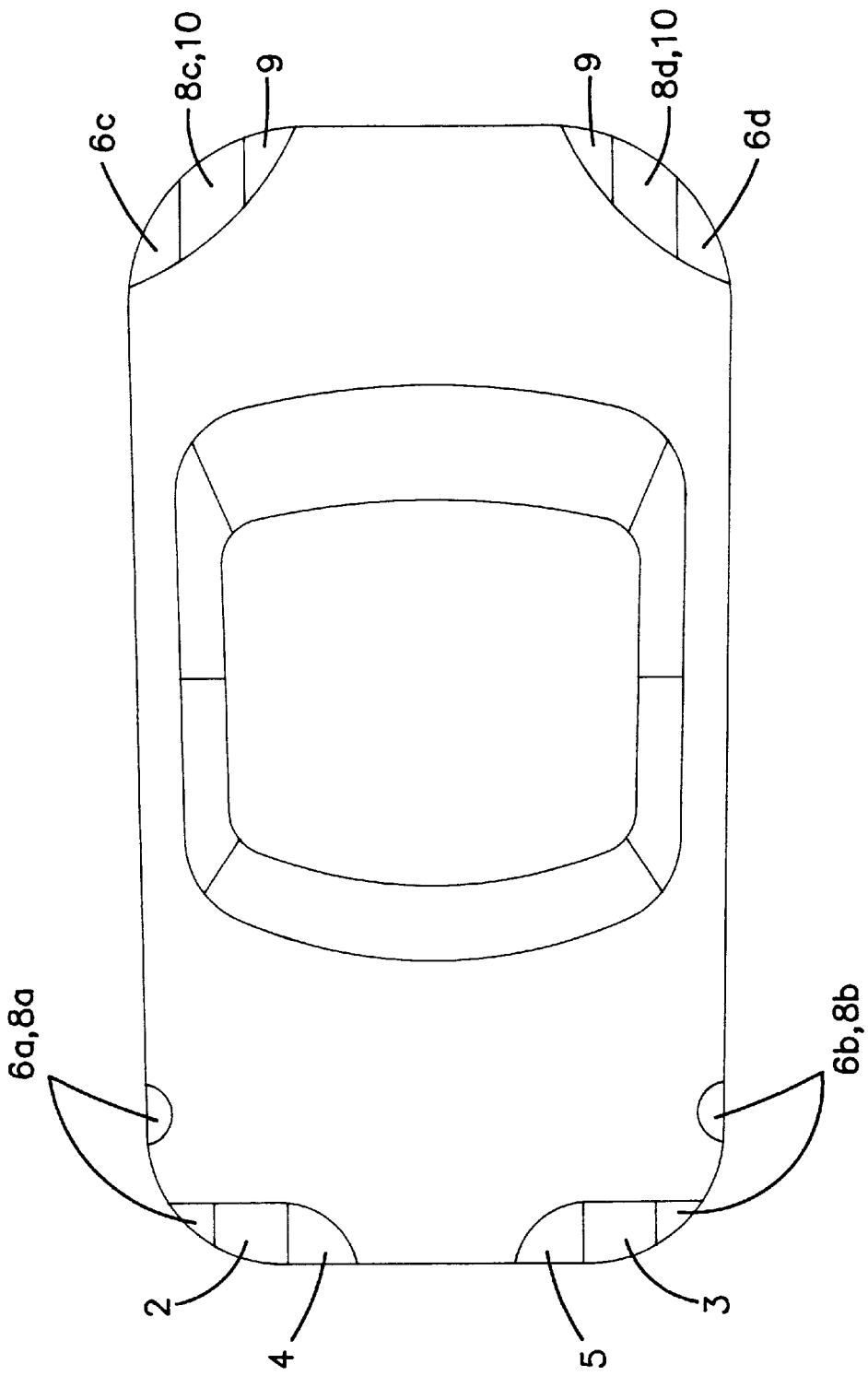
FIG. 1 is a representation of a vehicle and the typical operating lights found thereon.

FIG. 1 is a representation of the operating lights typically found on a vehicle. Right high beam 2 and left high beam 3 as well as right low beam 4 and left low beam 5 are shown in on the front of the vehicle. There will also be parking lights 6 on both the front left 6b and right 6a of the vehicle and right front blinker 8a and left front blinker 8b. In the vehicle illustrated, the lamp for right blinker 8a is the same as for front parking light 6a and that for left blinker 8b the same as parking light 6b. In the rear of the vehicle, there will be right tail light 6c, left tail light 6d, right rear blinker 8c, left rear blinker 8d, brake lights 10 and reverse lights 9. Rear blinkers 8c and 8d will operate on the same lamp as brake lights 10. Of course the exact arrangement of operating lights on different makes and models of vehicles may vary somewhat (such as whether the blinker and parking light use the same lamp), but the LCS can easily be adapted to these minor variations.

In one preferred embodiment disclosed herein, and in accordance with one preferred software program attached as Appendix I the LCS can control the operating lights of the vehicle in the following preferred modes.

1. Hyper-flash

In the hyper-flash mode, the LCS will flash the operating lights in a manner so as to make the emergency vehicle as conspicuous as possible. In one preferred embodiment, microprocessor 40 (seen in FIG. 2) of the LCS will initiate the following light flashing combinations: right high beam 2, left front blinker 8b, and left rear blinker 8d will flash at a 4 Hz frequency for the first have of one second; left high beam 3, right blinker 8a, and right rear blinker 8c will flash at a 4 Hz frequency for the second half of one second; and reverse lights 9 will constantly flash at a 4 Hz frequency. As a safety feature, when the vehicle driver applies the brakes, brake lights 10 will be activated while the flashing of all lights in the rear of the vehicle is ceased. This prevents the flashing lights from unduly distracting following drivers from the brake light signal. Another safety feature is incorporated where the high beam headlights are on when the hyper-flash mode is initiated. In this situation, the LCS will automatically illuminate the low beam headlights as the LCS goes into hyper-flash mode. Without this automatic illumination of the low beam headlights, the vehicle operator could momentarily be in the dangerous situation where he or she is driving at high speeds at night with only the disorienting flash of the high beam headlights.

2. Black-out

In this mode, the LCS does not allow the operating lights switches to transfer power to the their respective lamps. Therefore applying the brakes, putting the car in reverse or taking other actions that normally automatically illuminate an operating light will not cause the particular lamp to be illuminated. As a safety feature, the black-out program can be modified to allow the LCS to exit black-out mode when the vehicle is put into reverse or when the ignition switch is turned off. Because the modification can by made by simply loading a new software program into the microprocessor, this modification can be made easily and inexpensively even after the LCS has been installed in the vehicle.

3. One Out

One out allows a police vehicle to be disguised by preventing one of the vehicle headlights from being illuminated, thereby giving the appearance at night of a dilapidated vehicle. The one out mode is programmed to operate with any one of the headlights, low beam/high beam or left/right. This ability to select different lights prevents the public from associating a particular "broken" headlight pattern with police vehicles.

Schematic of Circuitry

Figure 2:
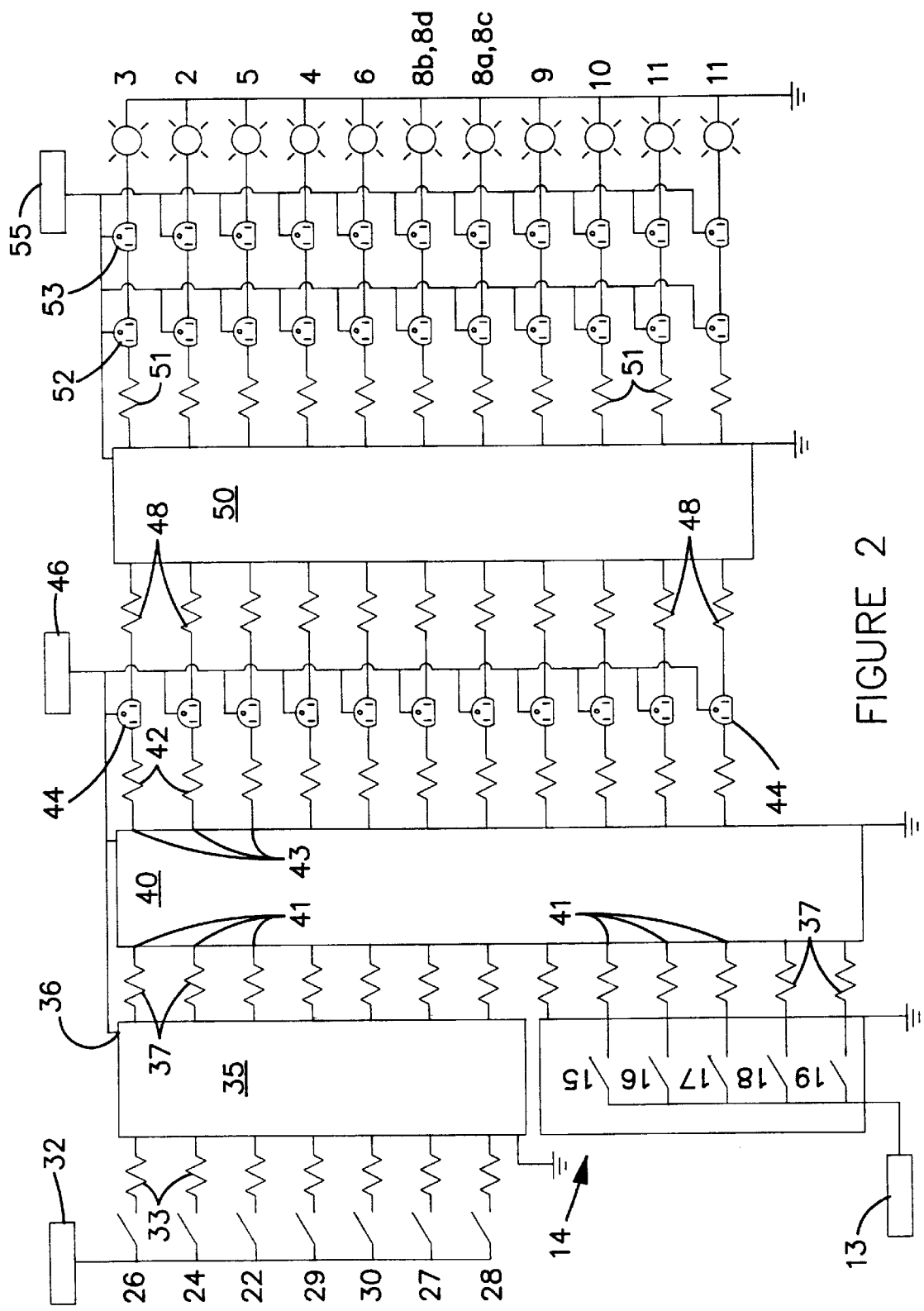
FIG. 2 is a schematic of the circuitry in one preferred embodiment of the light control system.

Turning to FIG. 2, a schematic of the circuitry making up the LCS is shown. The main components of the LCS include a switchbox 14, optoisolators 35 and 50, microprocessor 40, and transistors 44, 52, and 53. The left side of FIG. 2 illustrates parking light switch 26, low beam switch 24, high beam switch 22, reverse light switch 29, brake lights switch 30, lift blinker switch 27, and right blinker switch 28. The right side of FIG. 2 illustrates the individual light bulbs or lamps associated with the operating lights 2–10 described above. Also shown are two accessory lamps 11 representing various other vehicle lights that could be connected to the LCS. As is seen in FIG. 2, the LCS will be positioned in the vehicle's operating light circuitry between the light switches 22–30 and operating lights 2–10.

Each of the switches 22–30 forms a selective electrical connection between 12 volt source 32 (typically the vehicle battery) and optoisolators 35. While optoisolators 35 are shown in a single block, it will be understood that there is a separate optoisolator 35 for each connection between switches 22–30 and microprocessor 40. Further, there is a 300 Ω resistor 33 positioned between each switch 22–30 and optoisolators 35 for a total of 7 resistors 33. The purpose of optoisolators 35 are to insulate microprocessor 40, which is rated to receive only approximately 5–7 volts, from the comparatively large 12 volts required to operate the lights. In the embodiment shown, optoisolators 35 are those such as Phillips ECG stock number 3221. The current flowing from switches 22–30 is first reduced by 300 Ω resistor 33, causing the current flowing to optoisolators 35 to be in the range of 40 mA. This current then biases optoisolators 35 which in turn allow current from the 5 volt source 46 (connected to optoisolators 35 at junction 36) to flow through optoisolators 35 to resistors 37 and into microprocessor 40 through input pins 41. Resistors 37 are 47 kΩ resistors which insure that the current flowing from 5 volt source 46 into input pins 41 cannot exceed approximately 0.1 mA. Microprocessor 40 will be powered by 5 volt source 46 which connects to microprocessor 40 at junction 38.

Another set of current sources or signals are flowing into microprocessor 40 through input pins 41 from switchbox 14. Switchbox 14 contains the mode selection switches for the various lighting functions that may be programmed into the LCS. In the embodiment shown in FIG. 3, switchbox 14 includes switch 15 for hyper-flash mode, switch 16 for blackout mode, switch 17 for single out mode, switch 18 for a blackout light (a low intensity light providing just enough light to illuminate the area immediately in front of the vehicle), and at least one accessory switch 19. Switches 15–19 will selectively connect 5 volt source 13 to input pins 41 of microprocessor 40 via 47 kΩ resistors 37, such that only an approximately 0.1 mA current reaches microprocessor 40 as described above.

The signals microprocessor 40 receives from light switches 22–30 and mode selection switches 15–19 will be processed by the software program and the appropriate output signals will be sent from microprocessor 40 through output pins 43. While in the embodiment shown microprocessor 40 is a Motorola MC68HC711E9C micro-controller unit, microprocessor 40 could be any suitable microprocessor. The Motorola microprocessor operates the LCS program from EPROM allowing the LCS to be reprogrammed as needed. The signals leaving microprocessor 40 will proceed through 3.3 kΩ resistors 42 to transistors 44. Resistors 42 will reduce the current flowing from microprocessor 40 to approximately 0.8 mA which is an acceptable level to prevent any damage to microprocessor 40.

As previously stated, the signal leaving microprocessor 40 will be approximately 0.8 mA. This signal is not sufficient to bias optoisolators 50. Therefore transistors 44 and voltage source 46 are interposed between microprocessor 40 and optoisolators 50. In the embodiment shown, transistor 44 is a 2N222 bipolar junction transistor such as those designated Phillips ECG stock number 123A. The 0.8 mA signal from microprocessor 40 is sufficient to bias transistors 44, which in turn allows 5 volt source 46 to supply a current through 100 Ω resistor 48 such that optoisolators 50 receive a 30–35 mA current. While 100 Ω resister 48 does not by itself reduce the current from 5 volt source 46 to 30–35 mA, those skilled in the art will immediately recognize that transistors 44 have a certain inherent resistance that reduces the current to 30–35 mA. This principle applies as well to transistors 52 and 53 discussed below. FIG. 2 illustrates a total of 11 resistors 48.

The 30–35 mA current from 5 volt source 46 is sufficient to bias optoisolators 50. When optoisolators 50 are biased, current from 12 volt source 55 is allowed to flow through resistors 51. Resistors 51 are 100 Ω resistors causing the current flowing into transistors 52 to be approximately 40 mA (again, the inherent resistance of optoisolators 50 is combined with resistors 51). Transistor 52 is also a 2N222 bipolar junction transistor, such as Phillips ECG stock number 123A. When the 40 mA current biases transistor 52, transistor 52 allows an approximately 200 mA current to flow to transistor 53, a 2N3055 bipolar junction transistor such as Phillips ECG stock number 130. This in turn biases transistor 53 which allows the current needed to illuminate operating lights 2–10 to be drawn from 12 volt source 55 and supplied to operating lights 2–10.

The above described embodiment is only one preferred embodiment. Those skilled in the art will unquestionably recognize many alternate embodiments falling within the scope of the present invention. While the preferred embodiment describes the LCS operating in an automobile, the LCS could also find application in other vehicles such as trains, aircraft or boats. Additionally, while the digital logic controller of the described embodiment is a microprocessor, it is envisioned that other digital logic control methods could be used. These methods may include existing devices such as logic chips or other yet to be invented digital logic devices. Those skilled in the art will also recognize the LCS has a significant advantage in that it is not only controlled by the mode selection switches 15–19. Rather the LCS also interfaces with light switches 22–30 allowing the LCS to constantly monitor the status of these switches. This allows the LCS to give certain lights priority over others while the LCS is operating in a particular mode (e.g. brake lights over-riding the other lights in the vehicle rear when the LCS is in hyper-flash mode). This and the other advantages discussed above provide a Light Control System which is neither disclosed nor suggested by the present state of the art.

I claim:

1. In an emergency vehicle having (1) a plurality of operating lights, including headlights and reverse lights, and (2) a plurality of operating light switches corresponding to said operating lights, a light control system comprising a digital logic controller including:

i) a plurality of input pins on said digital logic controller adapted for connection with the operating light switches of a vehicle;

ii) a plurality of output pins on said digital logic controller adapted for connection with the operating lights of a vehicle;

iii) a plurality of mode selection switches on said digital logic controller for selecting different combinations of flashing operating lights.

2. A light control system according to claim 1, wherein said light control system flashes at least two individual operating lights at different frequencies.

3. A light control system for controlling the operating lights of a vehicle comprising:

a. a plurality of operating lights;

b. a plurality of operating light switches; and c. a digital logic controller including;
  i. a plurality of input pins on said digital logic controller connected to said operating light switches;
  ii. a plurality of output pins on said digital logic controller connected with said operating lights; and
  iii. a plurality of mode selection switches on said digital logic controller for selecting different combinations of flashing operating lights.

4. A light control system according to claim 1, wherein said digital logic controller utilizes pulse width modulation.

5. A light control system according to claim 1, wherein said digital logic controller is a microprocessor.

6. A light control system according to claim 3, wherein said digital logic controller is a microprocessor.

7. A light control system according to claim 3, wherein said digital logic controller utilizes pulse width modulation.

8. A light control system according to claim 3, wherein said digital logic controller receives input signals from both said operating light switches and said mode selection switches.

9. A light control system according to claim 8, wherein said digital logic controller includes a software program for processing input signals from said operating light switches and said mode selection switches to produce a software controlled output signal to said operating lights.

10. A light control system for controlling the operating lights of a vehicle comprising:
  a) at least two operating lights, a first of said operating lights being a headlight and a second of said operating lights being an operating light from the group consisting of front blinkers, rear blinkers, tail lights, or reverse lights;
  b) an operating light switch corresponding to each of said operating lights; and
  c) a programmable digital logic controller including;
    i) a plurality of input pins on said digital logic controller connected to said operating light switches;
    ii) a plurality of output pins on said digital logic controller connected with said operating lights; and
    iii) a plurality of mode selection switches on said digital logic controller for selecting different combinations of operating lights to be flashed at a predetermined frequency.

11. A light control system according to claim 10, wherein said digital logic controller is a microprocessor.

12. A light control system according to claim 10, wherein said digital logic controller receives input signals from both said operating light switches and said mode selection switches.

13. A light control system according to claim 12, wherein said digital logic controller includes a software program for processing input signals from said operating light switches and said mode selection switches to produce a software controlled output signal to said operating lights.

14. A light control system according to claim 10, wherein said digital logic controller utilizes pulse width modulation.

15. A light control system according to claim 1, wherein said output pins are connected to said operating lights and said input pins are connected to said operating light switches, whereby said digital logic controller receives input signals from both said operating light switches and said mode selection switches.

16. A light control system according to claim 15, wherein said digital logic controller processes input signals from said operating light switches and said mode selection switches to produce an output signal to said operating lights.

* * * * *